(12) United States Patent
Kishi et al.

(10) Patent No.: US 6,869,581 B2
(45) Date of Patent: Mar. 22, 2005

(54) HOLLOW GRAPHENE SHEET STRUCTURE, ELECTRODE STRUCTURE, PROCESS FOR THE PRODUCTION THEREOF, AND DEVICE THUS PRODUCED

(75) Inventors: Kentaro Kishi, Minamiashigara (JP); Hisae Yoshizawa, Minamiashigara (JP); Hiroyuki Watanabe, Minamiashigara (JP); Shinji Hasegawa, Minamiashigara (JP); Hirokazu Yamada, Minamiashigara (JP); Miho Watanabe, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 142 days.

(21) Appl. No.: 10/093,890

(22) Filed: Mar. 11, 2002

(65) Prior Publication Data

US 2003/0098640 A1 May 29, 2003

(30) Foreign Application Priority Data

Nov. 27, 2001 (JP) ........................................ 2001-361059

(51) Int. Cl.$^7$ .................................................. D01F 9/12
(52) U.S. Cl. .................................... 423/447.6; 423/460
(58) Field of Search .............................. 423/447.6, 460

(56) References Cited

FOREIGN PATENT DOCUMENTS

| JP | 8-91816 | 4/1996 |
|---|---|---|
| JP | 2000-233004 A | 8/2000 |
| JP | 2001-180920 A | 7/2001 |

OTHER PUBLICATIONS

Ajayan et al. 'Opening Carbon Nanotubes with Oxygen and Implications for Filling' *Nature* vol. 362 Apr. 8, 1993 pp. 522–525.*

Liu et al., "Fullerene Pipes," Science, vol. 280, May 22, 1998, pps. 1253–1256

Yudasaka et al., "Effect of an Organic Polymer in Purification and Cutting of Single–Wall Carbon Nanotubes," Appl. Phys. A, vol. 71, 2000, pps. 449–451.

Watanabe, "Local Etching Effect of Fine Gold Particles Deposited on Graphite," Jpn, J. Appl. Phys., vol. 32, No. 6a, Part I, Jun. 1993, pps. 2809–2813.

Mizoguti, et al., "Purification of Single–Wall Carbon Nanotubes by Using Ultrafine Gold Particles," Chemical Physics Letters, vol. 321, 2000, pps. 297–301.

* cited by examiner

*Primary Examiner*—Stuart Hendrickson
(74) *Attorney, Agent, or Firm*—Oliff & Berridge, PLC

(57) ABSTRACT

A hollow graphene sheet structure has at least one pair of hollow graphene sheet materials disposed in a continuous form, in which the adjacent ends of the pair of hollow graphene sheet materials are opposed to each other with a gap.

20 Claims, 6 Drawing Sheets

HOLLOW GRAPHENE SHEET STRUCTURE, ELECTRODE STRUCTURE, PROCESS FOR THE PRODUCTION THEREOF, AND DEVICE THUS PRODUCED

BACKGROUND OF THE INVENTION

1. Field of the Invention

The present invention relates to a hollow graphene sheet structure and an electrode structure which can be widely used in electronic devices, etc., a process for the production thereof and a novel device comprising the electrode structure.

2. Description of the Related Art

A carbon nanotube comprises a graphene sheet (sheet-like structure of hexagonal network of carbon atoms) rounded in a hollow form. Since a carbon nanotube shows a high electrical conductivity despite its diameter as small as 1 to 50 nm in addition to its chemical stability, it has been under extensive study for its application to devices ranging from macroscale device such as discharge electrode to nanoscale electronic device. Since a carbon nanotube itself is tough besides being electrically conductive, it has been under study for application to support for reinforcing material or structure and hydrogen storing material utilizing the action of hollow structure.

Main applications for which such a carbon nanotube has been studied are single-wall carbon nanotube (SWNT) comprising one graphene sheet and multi-wall carbon nanotube (MWNT) comprising multiple layers of graphene sheet.

On the other hand, for the mass production of carbon nanotube, various methods such as arc discharge method and laser ablation method have been studied. However, since a carbon nanotube itself is a string-like material, its application is limited if it is used as it is. Therefore, a working technique such as cutting the carbon nanotube thus produced is required.

For example, in the case where a minute electronic device having a large amount of memory elements is prepared, even when the wiring itself can be formed by a carbon nanotube to have a reduced width, the size of the entire device can difficultly be reduced if the carbon nanotube itself is long.

As methods for working carbon nanotube there have been known a method which comprises cutting SWNT by oxidation with a strong acid (J. Liu et al., "Science", 280, p. 1253 (1998)), a method which comprises cutting carbon nanotube in the form of a dispersion in a polymer by screw (M. Yudasaka et al., "Appl. Phys.", A71, p. 449–451 (2000)), a method which comprises grinding and cutting carbon nanotube in the form of an ingot obtained by fixing in metal particles (Japanese Patent Laid-Open No. 2000-223004), and a method which comprises cutting carbon nanotube by ion irradiation (Japanese Patent Laid-Open No. 2001-180920).

However, the foregoing process involving the use of a strong acid is disadvantageous in that the entire carbon nanotube is damaged and the carbon nanotube must be heated over an extended period of time, making it difficult to obtain severed carbon nanotubes having desired properties and giving a drastically deteriorated productivity.

Further, this method cannot be used to cut a multi-wall carbon nanotube because many layers must be oxidized until the carbon nanotube is cut. In the method involving the dispersion in a polymer, complete cutting requires ultrasonic treatment, and a heating and combustion procedure is required to remove the polymer, adding to complicatedness.

In the method involving the use of metal particles, the carbon nanotubes thus cut cannot be generally used except in that carbon nanotubes protruding from the surface of the ingot are used as emitter.

In the method involving ion irradiation, it must use an acceleration voltage of from several kilovolts to scores of kilovolts requiring a large-scale device and two steps, i.e., step of forming an unbonded site on carbon nanotube by ion irradiation and step of cutting carbon nanotube by reaction of the unbonded site with oxygen or hydrogen, adding to complicatedness.

As mentioned above, these known working methods have disadvantages.

On the other hand, a method which comprises etching the surface of graphite with a particulate gold as an oxidizing catalyst is described in H. Watanabe, "Jpn. J. Appl. Phys.", 32, p. 2809 (1993).

Since a carbon nanotube is subject to contamination by a large amount of impurities such as amorphous carbon and graphite during its production process, E. Mizoguchi et al. proposed as a method for extracting carbon nanotube by referring to these literatures a method which comprises mixing gold particles with a surfactant, heating the mixture in an oxygen atmosphere so that the amorphous carbon and graphite are oxidized and decomposed away to leave as an extract SWNT which is stable as compared with these impurities (E. Mizoguchi et al., "Chem. Phys. Lett.", 321, p. 297–301 (2000)).

It is described that in this method, heating at high temperature causes SWNT itself to be oxidized and decomposed away. Accordingly, the combination of a particulate gold and a carbon nanotube allows the removal of impurities but cannot be expected to be applied to shaping of carbon nanotube. There are neither suggestions on this application.

In order to prepare a device comprising carbon nanotube or provide a carbon nanotube itself with desired functions, it is desirable to simply work the carbon nanotube itself without impairing the properties thereof. The methods which are known at present have the foregoing advantages and disadvantages.

In order to use a carbon nanotube for various purposes, a carbon nanotube having a new shape is required.

On the other hand, in order to use a carbon nanotube as an electrode for connecting elements, it is a great task how the carbon nanotube itself is disposed. In other words, the carbon nanotube is very fine and thus can be difficultly handled. For example, when carbon nanotubes are used as at least two electrodes, it is extremely difficult to dispose the two carbon nanotubes such that a minute gap occurs according to the minute node space of electronic elements having a reduced size.

The invention has been worked out in the light of the foregoing problems. An aim of the invention is to provide a novel hollow graphene sheet structure and electrode structure by cutting or otherwise working a hollow graphene sheet material comprising carbon nanotube with a lessened damage on the structure of the hollow graphene sheet material. Another aim of the invention is to realize the application of the electrode structure to a minute device of hollow graphene sheet material such as carbon nanotube.

SUMMARY OF THE INVENTION

In order to solve these problems, the invention proposes a novel production process for shaping a hollow graphene sheet material comprising a carbon nanotube and a novel hollow graphene sheet structure and electrode structure obtained by the production process. The invention further proposes a device to which the foregoing electrode structure is applied, etc.

The term "hollow graphene sheet material" as used herein is meant to indicate a hollowly rounded structure of graphene sheet, generally including hollow graphene sheet materials having a diameter on the order of nanometer such as straw-like carbon nanotube, conical carbon nanohorn, carbon nanobeads having bead-like carbon structures attached to straw-like carbon nanotube and helical carbon nanocoil.

As mentioned previously, in accordance with the method by E. Mizoguchi et al, carbon nanotube itself undergoes oxidative destruction and disappearance. Thus, the carbon nanotube cannot be shaped by a particulate gold.

The inventors made further studies of this method. As a result, the cause of the total disappearance of the carbon nanotube in the case of oxidation of mixture of particulate gold and single wall carbon nanotube was made clear, and it was found that the combination of a particulate metal having an oxidation catalytic action and a carbon nanotube makes it possible to shape the carbon nanotube. It was also found that besides gold, other metals have a catalytic action inducing oxidation of carbon nanotube and thus can be used to work hollow graphene sheet material.

In other words, the invention as follows, but the invention is not limited to the below.

<1> There is provided a hollow graphene sheet structure having at least one pair of hollow graphene sheets disposed continuously in a longitudinal direction of the hollow graphene sheets and in which adjacent ends of the pair of hollow graphene sheets are opposed to each other with a gap.

<2> There is provided a process for production of a hollow graphene sheet structure having the steps of applying a particulate catalyst inducing oxidation of a graphene sheet on a hollow graphene sheet and acting the particulate catalyst in an atmosphere containing oxygen to work shape of the hollow graphene sheet.

<3> There is provided the process according to clause <2>, in which the catalyst is a particulate metal inducing the oxidation of a graphene sheet and the acting step has the steps of heating the catalyst at temperature lower than temperature at which the hollow graphene sheet is combusted in the absence of the catalyst.

<4> There is provided the process according to clause <3>, further having the steps of disposing the particulate metal at a middle position of the hollow graphene sheet in a longitudinal direction, oxidizing the hollow graphene sheet in the vicinity of the position where the particulate metal is disposed to cut the hollow graphen sheet.

<5> There is provided the process according to clause <4>, wherein the particulate metal is fixed on a substrate.

<6> There is provided the process according to clause <4>, further having the steps of removing the particulate metal.

<7> There is provided the process according to any one of clause <3> to <6>, in which the particulate metal is a particulate gold.

<8> There is provided the process according to clause <3> to <6>, in which the particulate metal is one of particulate silver, particulate copper, and particulate platinum.

<9> There is provided the process according to clause <3>, in which the hollow graphene sheet is a multi-wall carbon nanotube and the particulate metal is a particulate platinum.

<10> There is provided the process according to clause <3>, further having the steps of disposing the particulate metal at a middle position of the hollow graphene sheet in a longitudinal direction with using a mask.

<11> There is provided an electrode structure having a pair of electrodes disposed opposed to each other with a gap, in which the electrodes are a pair of hollow graphene sheets, the pair of hollow graphene sheets are disposed continuouslyin a longitudinal direction of the pair of hollow graphene sheets, and adjacent ends of the pair of hollow graphene sheets are opposed to each other with the gap.

<12> There is provided an electrode structurehaving a pair of electrodes disposed opposed to each other with a gap, in which the electrodes are a pair of hollow graphene sheets, adjacent ends of the pair of hollow graphene sheets are opposed to each other with the gap, a particulate metal is disposed in the gap and a minute gap is defined between the particulate metal and each of the adjacent ends of the pair of hollow graphene sheets.

<13> There is provided an electrode structure comprising in which the electrodes are a pair of hollow graphene sheets, adjacent ends of the pair of hollow graphene sheets are opposed to each other with the gap, a particulate metal is disposed in the gap and the particulate metal and one of the adjacent ends of the pair of hollow graphene sheets are electrically connected to each other.

<14> There is provided a process for production of an electrode structure, having the steps of disposing particulate metal at a middle position of hollow graphene sheet in a longitudinal direction and oxidizing the hollow graphene sheet in the vicinity of the position where the particulate metal in an atmosphere containing oxygen to cut the hollow graphene sheet at the point, whereby the electrode structure is formed.

<15> There is provided the process according to clause <14>, further having the steps of fixing the particulate metal to a surface of a substrate.

<16> There is provided the process according to clause <14>, further having the steps of removing the particulate metal.

<17> There is provided the process according to any one of clauses <14>to <16>, in which the particulate metal is a particulate gold.

<18> There is provided the process according to any one of clauses <14>to <16>, in which the particulate metal is one of particulate silver, particulate copper, and particulate platinum.

<19> There is provided a device having a pair of electrodes disposed opposed to each other with a gap and a functional element having a predetermined electrical function, in which the electrodes are a pair of hollow graphene sheets, adjacent ends of the pair of hollow graphene sheets are opposed to each other with the gap, a particulate metal is disposed in the gap, a minute gap is defined between the particulate metal and each of the adjacent ends of the pair of hollow graphene sheets, and the functional element is connected to the particulate metal and one of the adjacent ends of the pair of hollow graphen sheets.

<20> There is provided a device having a pair of electrodes disposed opposed to each other with a gap and an functional organic molecule, in which the electrodes are a pair of hollow graphene sheets, adjacent ends of the pair of hollow graphene sheets are opposed to each other with the gap, a particulate metal is disposed in the gap, a minute gap is defined between the particulate metal and each of the adjacent ends of the pair of hollow graphene sheets, and the organic functional molecule is inserted in the minute gap.

<21> There is provided a hollow graphene sheet structure having a graphene sheet having at least one layer and tube shape and a region in a longitudinal direction in which another graphene sheet having at least one layer is laminated on the graphen sheet.

Referring further to the foregoing descrption, the particulate gold acts as a very effective oxidation catalyst for carbon nanotube. However, E. Mizoguchi, et al. didn't aim at working carbon nanotube but aimed only at removing impurities and thus dispersed gold particles entirely in the carbon nanotube. Therefore, once finished in the decomposition of a nearby carbon nanotube at the heating step for oxidation, the particulate gold moved to other carbon nanotubes to decompose them successively. After all, all the carbon nanotubes were decomposed in this attempt. There were no suggestions on the application of this method to the shaping of carbon nanotube.

However, the inventors found that using the particulate gold fixed on the substrate makes it possible to partially decompose the carbon nanotube and hence cut the carbon nanotube at the heating step for oxidation if the particulate gold is prevented from moving freely.

Some particulate materials inducing oxidation of carbon nanotube don't exhibit active catalytic action (presumably movement of particles due to heat energy) as by the foregoing particulate gold at a heating temperature causing oxidation. In this case, oxidation occurs only in the vicinity of the particles. Thus, it was found that such particulate materials can be used to shape carbon nanotube.

In other words, the inventors found that the action of a particulate catalyst inducing oxidation of carbon nanotube makes it possible to shape carbon nanotube. The utilization of this action makes it also possible to provide a novel carbon nanotube, an electrode structure having a minute gap, etc.

DETAILED DESCRIPTION OF THE PREFERRED EMBODIMENT

The invention will be further described with reference to embodiments of implication of the invention.

1st Embodiment

In the present embodiment, a carbon nanotube structure (a hollow graphene sheet structure) having at least one pair of hollow graphene sheets (carbon nanotube) disposed in a continuous form, in which adjacent ends of the pair of hollow graphene sheets are opposed to each other with a gap and a process for the production thereof will be described.

Figure 1:
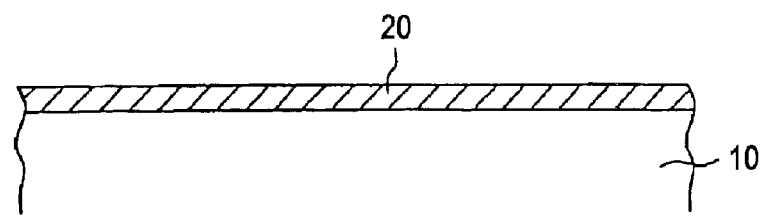
FIG. 1 is a schematic enlarged sectional view illustrating a thin metal film formed on the surface of a substrate.
Figure 2:
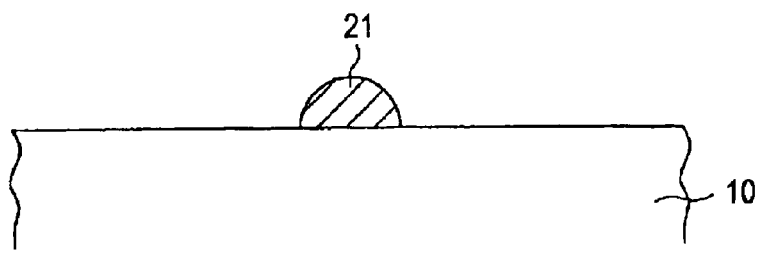
FIG. 2 is a schematic enlarged sectional view illustrating a particulate metal formed on the surface of a substrate.
Figure 3:
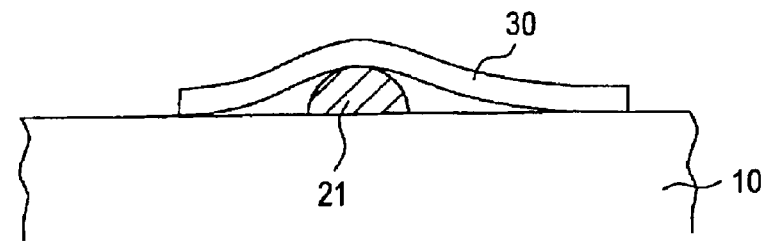
FIG. 3 is a schematic enlarged sectional view illustrating a particulate metal and a carbon nanotube (hollow graphene sheet material) disposed on the surface of a substrate.
Figure 4:
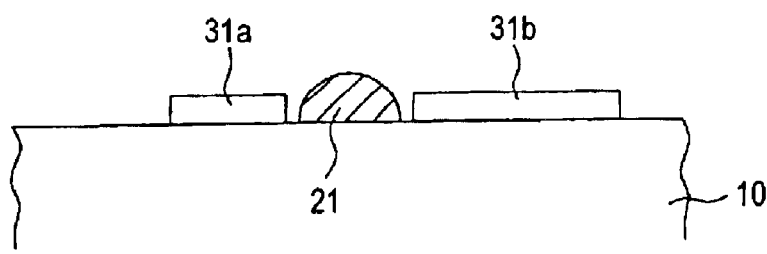
FIG. 4 is a schematic enlarged sectional view illustrating a hollow graphene sheet structure of the invention.

FIGS. 1 to 4 each are an enlarged sectional view schematically illustrating the process for the production of the carbon nanotube structure according to the present embodiment. FIG. 1 illustrates how a thin metal film 20 is formed on the surface of a substrate 10, FIG. 2 illustrates a particulate metal 21 which is formed by the thin metal film 20, FIG. 3 illustrates how the particulate metal 21 is covered by a carbon nanotube 30, and FIG. 4 illustrates a carbon nanotube structure obtained by cutting the carbon nanotube 30.

Firstly, as shown in FIG. 1, sputtering is made on the surface of the substrate to form the thin metal film 20 thereon. The formation of the thin metal film 20 can be accomplished by any known thin film formation method such as vacuum evaporation and CVD other than sputtering.

The metal to be used for the thin metal film 20 is not specifically limited so far as when the metal film 20 is formed into particulate, the particulate metal induces oxidation action on the carbon nanotube 30 in an oxygen atmosphere. Materials other than metal may be used. In the invention, gold, silver, platinum and copper are preferably used. Further, an alloy of these metals may be used. Alternatively, these particulate metals may be used in the form of dispersion in a resin or the like.

When a glass substrate having little trap of metal atoms is used as the substrate 10, the distribution of the particulate metal 21 after the heating (pretreatment) for globurization described later can be uniform. On the contrary, a substrate having a trap such that the agglomeration site is intentionally provided with regularity may be used.

The term "trap" as used herein is meant to indicate the site at which a metal atom is fixed and can difficultly move even upon heating, e.g., minute indentation on the surface of crystal, site having a relatively low energy level at which metal atoms can easily gather.

The thickness of the thin metal film 20 is preferably small enough to form a discontinuous film on the surface of the substrate in order that the thin metal film 20 makes catalytic action in the form of particulate material. In some detail, it is preferably from 1 to 100 nm. In particular, when globurization (pretreatment) described below is effected, the thickness of the thin metal film 20 is preferably from 5 to 30 nm.

Subsequently, as shown in FIG. 2, the thin metal film 20 is heated to a temperature close to the melting point of the metal (pretreatment). During this treatment, the difference in surface energy between the metal and the substrate 10 and the movement of metal atoms (agglomerated material) due to heating cause the thin metal film 20 to agglomerate to a particulate metal 21 on the surface of the substrate 10.

A metal such as gold normally stays inactive even when heated in an oxygen atmosphere but becomes activated at a heating temperature lower than its melting point when rendered particulate. Accordingly, the globurization of the metal by the foregoing pretreatment or the like is important not only for the purpose of cutting the carbon nanotube at a minute point but also for the purpose of obtaining an active point for oxidation reaction.

As the metal atoms form particles, the metal such as gold is fixed to the surface of the substrate 10. The term "fixed" as used herein is meant to indicate that even when the carbon nanotube described later is heated to oxidation temperature, the particulate metal 21 doesn't move. In some detail, in the case where the particulate metal 21 is small and almost spherical before or during the heat treatment, the particulate metal 21 can easily move along the surface of the substrate 10 during the heat treatment because the particulate metal 21 has a small contact area with the substrate 10. However, when the particulate metal 21 has increased its size somewhat or has an almost semi-spherical shape, it has an increased contact area with the substrate 10 and thus doesn't move along the surface of the substrate 10 even during heating. Accordingly, the term "fixed" as used herein is presumably meant to indicate the foregoing state.

As already mentioned, in accordance with the invention, the hollow graphene sheet material comprising a carbon nanotube is cut by the oxidation action of the particulate metal 21. Accordingly, some metals need to be pretreated so that particles of these metals are fixed to the surface of the substrate 10.

The particle diameter of the particulate metal 21 is preferably from 10 nm to 5 μm, more preferably from 50 nm to 1 μm. When the particle diameter of the particulate metal 21 falls below 10 nm, the particulate metal 21 cannot come in contact with the carbon nanotube 30, making it impossible to have sufficient oxidation action or making it impossible for the particulate metal 21 to be firmly fixed to the substrate 10. On the contrary, when the particle diameter of the particulate metal 21 exceeds 5 μm, the particulate metal 21 can have a deteriorated catalytic activity.

The foregoing heat treatment doesn't need to be effected if the metal atoms have been agglomerated to particles on the surface of the substrate 10 even when not subjected to heat treatment. The process for forming a particulate metal directly on the surface of the substrate 10 is not specifically limited. However, it is not preferred that the resulting particulate metal be nearly in the form of thin film or have a great particle diameter. It is preferred that the resulting particulate metal have a particle diameter of from 10 nm to 5 μm.

The distance between the metal particles 21 can be controlled depending on the purpose of working as described later. However, in the case where the distance between the metal particles 21 falls below 10 nm, one carbon nanotube 30 having an ordinary length which is commonly used cannot be properly disposed with respect to one particulate metal 21. On the contrary, in the case where the distance between the metal particles 21 exceeds 5 μm, there are many carbon nanotubes 30 which don't come in contact with the metal particles 21, occasionally making it impossible to shape efficiently the carbon nanotube 30.

The distance between the metal particles 21 (distribution of metal particles 21 on the surface of the substrate 10) can be controlled by the thickness of the thin metal film 20, the heating temperature at the pretreatment step, etc. in addition to the kind of the metal or substrate 10. For example, even if the thin metal film 20 is formed by the same kind of metal in the same amount, the heating temperature at the pretreatment step can be raised to increase the particle diameter of the particulate metal 21 as well as the distance between the metal particles. On the contrary, the pretreatment temperature can be lowered to decrease the particle diameter of the particulate metal 21 as well as the distance between the metal particles.

Subsequently, a dispersion of carbon nanotube 30 in an organic solvent is sprayed onto the surface of the substrate 10 on which the particulate metal 21 has been formed so that the carbon nanotube 30 is disposed covering the particulate metal 21 as shown in FIG. 3. In this case, it is necessary that the carbon nanotube 31 to be cut come in contact with the particulate metal 21 at least at one point. Carbon nanotubes which are not to be cut may be present on the surface of the substrate 10.

The carbon nanotube 30 to be used in the present embodiment may be either a single wall carbon nanotube or a multi-wall carbon nanotube.

The length of the carbon nanotube 30 is preferably from 10 nm to 100 μm, more preferably from 20 nm to 10 μm. When the length of the carbon nanotube 30 falls below 10 nm, it is also shorter than the particle diameter of the particulate metal 21 and thus can entirely disappear when subjected to oxidation by the particulate metal 21 as described later. On the contrary, when the length of the carbon nanotube 30 exceeds 100 μm, the carbon nanotubes can occasionally become entangled with each other and thus can be inconvenient in handling.

The diameter of the carbon nanotube 30 is preferably from 1 to 100 nm. When the diameter of the carbon nanotube 30 falls below 1 nm, the resulting carbon nanotube structure has too weak as a nanotube to keep in the form of structure. On the contrary, when the diameter of the carbon nanotube 30 exceeds 100 nm, the resulting carbon nanotube can be difficultly cut in the present embodiment.

As the organic solvent there is preferably used ethanol, isopropanol, tetrahydrofuran or the like. The concentration of carbon nanotube 30 to be dispersed in the organic solvent is preferably from 0.1 to 1% by weight because the carbon nanotube 30 can be uniformly disposed on the surface of the substrate 10.

In the preparation of the dispersion of carbon nanotube 30, a surfactant may be added to uniformalize the dispersion of carbon nanotube 30 in the organic solvent. However, since the use of such a surfactant can have an effect on the anchoring power of the particulate metal 21 on the substrate 10, the surfactant preferably decomposes at a temperature lower than the temperature at which the carbon nanotube 30 undergoes oxidation by the catalyst. Specific examples of the surfactant employable herein include sodium dodecylsulfate, benzalconium chloride, etc.

The coating method is not limited to spray coating. If a dispersion is used, spin coating or dipping may be effected.

Alternatively, the carbon nanotube 30 in the form of powder may be directly attached to the surface of the substrate 10.

Referring to the process for disposing the carbon nanotube 30 covering the particulate material 21, one carbon nanotube 30 may be disposed on one metal particle 21. In this case, under a scanning probe microscope (SPM), a substrate 10 having metal particles 21 formed thereon is observed as a sample substrate with a carbon nanotube as a probe. Under these conditions, the carbon nanotube 30 can be moved to cover the metal particles 21.

Subsequently, the substrate 10 thus sprayed is subjected to evaporation of solvent. The substrate 10 having the metal particles 21 and carbon nanotube 30 disposed thereon is entirely heated to a temperature inducing oxidation of the carbon nanotube 30 by the particulate metal 21 as a catalyst in an oxygen-containing atmosphere (heating step).

This heating temperature needs to be lower than the temperature at which the carbon nanotube 30 is combusted in the absence of the catalyst. When the heating temperature is not lower than the combustion temperature of the carbon nanotube 30, the carbon nanotube 30 can be totally burnt away.

In some detail, the heating temperature at which the carbon nanotube 30 is cut as in the present embodiment is preferably from $T_0$ to $T_0+200°$ C. supposing that $T_0$ is the combustion starting temperature of the carbon nanotube 30 in the presence of the catalyst.

The mechanism of induction of oxidation is unknown. The oxidation requires that oxygen be dissociated from the surface of the particulate metal 21. Thus, it is thought that when oxidation begins, the particulate metal 21 is melted somewhat on the surface thereof and stays activated. Accordingly, the heating temperature is preferably not lower than the temperature at which the metal used for the particulate metal 21 begins to melt. However, as the particle diameter of the particulate metal 21 decreases, the particulate metal 21 is more subject to the effect of heat. Accordingly, the heating temperature is preferably predetermined to be low.

The oxygen concentration in the oxygen-containing atmosphere where oxidation is induced to cut the carbon nanotube 30 is preferably not lower than 0.1%. However, oxidation can be sufficiency induced in ordinary atmosphere. This can apply to the oxygen-containing atmosphere described below.

As described in E. Mizoguchi et al., "Chem. Phys. Lett.", 321, p. 297–301 (2000), when the thin metal film 20 is made of gold, if the metal particles are not fixed to the substrate 10, the metal particles move along the surface of the substrate 10 during heating, causing the total decomposition and disappearance of the carbon nanotube 30. Accordingly, in order to work the carbon nanotube 30 using gold as a metal, it is preferred that the particulate metal be fixed to the substrate 10 so that the carbon nanotube 30 can be cut only at the area in the vicinity of the particulate metal.

FIG. 4 illustrates the concept of a carbon nanotube structure made of carbon nanotubes 31a and 31b obtained by thus cutting the carbon nanotube 30. The term "cut" as used herein is meant to indicate that when the particulate metal 21 oxidizes the graphene sheet, the carbon nanotube 30 partly disappears in the vicinity of the particulate metal 21 to form a gap.

The gap between the adjacent ends of the pair of carbon nanotubes 31a, 31b in the structure can be controlled by selecting the size of the particulate catalyst. Therefore, the two carbon nanotubes can be disposed opposed to each other at a higher precision than when the two mechanically severed carbon nanotubes are redisposed.

The gap between the particulate metal 21 disposed between the pair of carbon nanotubes 31 and the end 31 of one of the adjacent carbon nanotubes (minute gap) is from 0.1 to 50 nm because the reaction presumably ends at the time when cutting causes the formation of a gap between the metal particles.

Subsequently, the carbon nanotube shown in FIG. 4 having the carbon nanotubes 31a, 31b fixed to the substrate 10 is entirely dipped in a solution for dissolving the particulate metal 21 (aqua regia in the case of particulate gold) to remove the particulate metal 21, making it possible to obtain a carbon nanotube structure free of particulate metal between the adjacent ends of the pair of carbon nanotubes 31.

Thus, the foregoing process can apply not only to carbon nanotube but also to other hollow graphene sheet materials. Therefore, the invention can provide a hollow graphene sheet structure having at least one pair of hollow graphene sheets disposed in a continuous form in which adjacent ends of the pair of hollow graphene sheets are opposed to each other with a gap.

The foregoing carbon nanotube thus cut can be extracted by applying ultrasonic wave to the carbon nanotubes dipped in a solvent such as ethanol so that they are peeled off the substrate 10, and then removing the solvent. When the metal particles 21 are found uniformly distributed on the surface of the substrate 10, it means that the carbon nanotubes thus obtained have a uniform length according to the average gap between the metal particles 21.

2nd Embodiment

In the first embodiment, the substrate 10 having a thin metal film 20 formed thereon is subjected to heating as pretreatment so that the metal is globurized. However, depending on the kind of the metal used or the substrate 10 to be combined therewith, the particulate metals 21 move little along the surface of the substrates 10 at a temperature close to the combustion temperature of the carbon nanotube at which catalytic action occurs. For example, when the diameter of the particulate metal 21 increases drastically under the conditions that the thin metal film 20 is formed, the particulate material 21 cannot move even at the temperature where the carbon nanotube 30 is oxidized by the action of the catalyst. In the case where a substrate 10 which can easily trap the metal atoms is used, the particulate metal 21 cannot escape from the trap at around the temperature where the carbon nanotube 30 is oxidized.

Thus, in the case where an immobile metal is used as particulate metal or a substrate which can easily trap metal atoms is used, a carbon nanotube 30 maybe applied to the surface of the substrate 10 prior to the formation of the thin metal film.

In the present embodiment, the carbon nanotube structure comprising a pair of carbon nanotubes disposed opposed to each other with a gap obtained by the foregoing process will be described.

Figure 5:
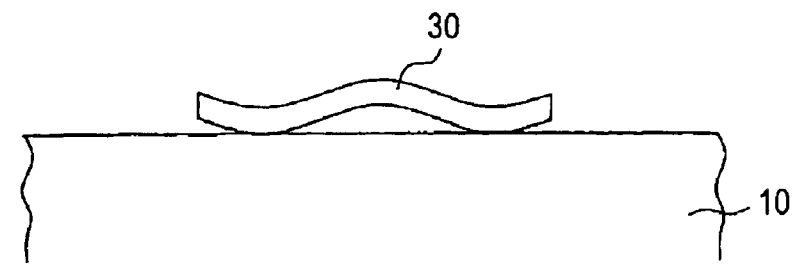
FIG. 5 is a schematic enlarged sectional view illustrating a carbon nanotube (hollow graphene sheet material) disposed on the surface of a substrate.
Figure 6:
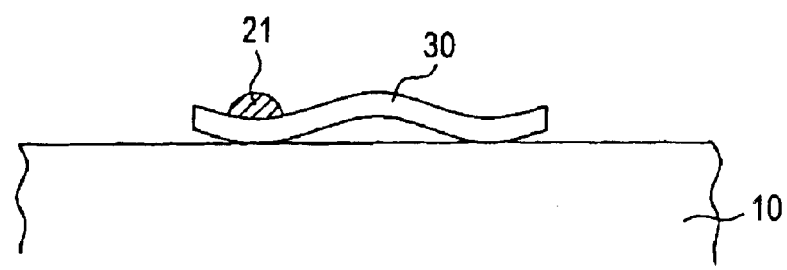
FIG. 6 is a schematic enlarged sectional view illustrating a particulate metal formed on the surface of carbon nanotube (hollow graphene sheet material)
Figure 7:
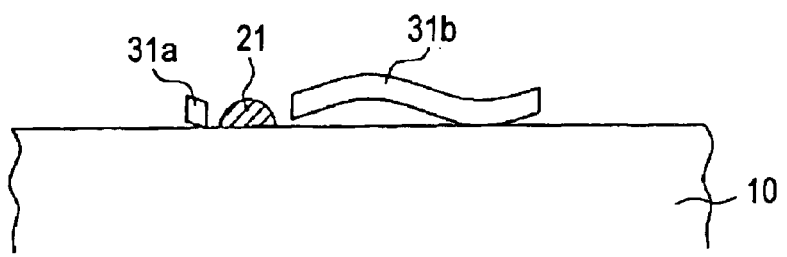
FIG. 7 is a schematic enlarged sectional view illustrating other hollow graphene sheet structure of the invention.

FIGS. 5 to 7 each are an enlarged sectional view schematically illustrating the process for the production of the carbon nanotube structure according to the present embodiment. FIG. 5 illustrates how the carbon nanotube 30 is disposed on the surface of the substrate 10, FIG. 6 illustrates how the particulate metal 21 is formed on the surface of the carbon nanotube 30, and FIG. 7 illustrates a carbon nanotube structure obtained by cutting the carbon nanotube 30.

Firstly, the same dispersion of carbon nanotube 30 in an organic solvent as used in the first embodiment is sprayed onto the surface of the substrate 10 so that the carbon nanotube 30 is disposed on the surface of the substrate 10 as shown in FIG. 5.

The preferred length and diameter of the carbon nanotube 30 to be used are the same as used in the first embodiment. The organic solvent to be used, concentration and coating method may be the same as used in the first embodiment.

The organic solvent may comprise an organic polymer incorporated therein as a binder for preventing the carbon nanotube 30 from being scattered after the evaporation of the organic solvent. The binder preferably decomposes at a temperature lower than the temperature at which the graphene sheet of carbon nanotube 30 is oxidized by the catalyst. For example, a vinyl polymer, an acrylic polymer, polyurethane, etc. may be used.

Subsequently, sputtering is made on the surface of the substrate 10 to form a thin metal film thereon. The substrate 10 is then heated to around the melting point of the metal in vacuum. In this manner, the particulate metal 21 can be formed or the binder can be decomposed as shown in FIG. 6 without causing the oxidation of the carbon nanotube 30 by the particulate metal 21 as a catalyst.

The preferred thickness of the thin metal film, particle diameter of the particulate metal 21 and gap between the metal particles 21 are the same as in the first embodiment.

As previously mentioned, particulate gold can easily move during heating except during the fixing on the surface of the substrate 10 and thus is not desirable as the metal to be used in the formation of the thin metal film. Accordingly, as the metal to be used in the present embodiment there is preferably used silver, copper or platinum rather than gold.

However, in the case where the melting point of the particulate metal 21 or the decomposition temperature of the binder is higher than the stable upper limit of the carbon nanotube 30 in vacuo, this process cannot be employed. Accordingly, this heating process may be omitted in this case.

Subsequently, the substrate 10 is moved into an oxygen-containing atmosphere where it is then heated to a temperature inducing oxidation of the carbon nanotube 30 by the particulate metal 21. Even in this state, the particulate metal 21 in FIG. 6 doesn't move along the surface of the carbon nanotube 30 and oxidize the entire carbon nanotube 30. Thus, the graphene sheet gradually undergoes oxidation and disappears at the area in the vicinity of the site it comes in contact with the particulate metal 21. In time, the carbon nanotube 30 is cut as shown in FIG. 7. Thus, a carbon nanotube made of the carbon nanotubes 31a, 31b thus separated is formed.

The carbon nanotube structure shown in FIG. 7 thus obtained eventually has a cut in the middle point similarly to that shown in FIG. 4. In accordance with the present embodiment, a hollow graphene sheet structure having at least one pair of hollow graphene sheets disposed in a continuous form, in which adjacent ends of the pair of hollow graphene sheets are opposed to each other with a gap can be obtained as with the first embodiment.

In accordance with the process of the present embodiment, on the other hand, when a particulate metal 21 which can easily move at around the temperature where the catalyst acts such as gold is used, the carbon nanotube 30 is entirely oxidized, making it impossible to shape the carbon nanotube 30. In this case, a design needs to be made to inhibit the movement of the particulate catalyst, e.g., selection of a substrate which can easily trap metal atoms and increase of the particle diameter of the particulate metal 21.

In this manner, even if the particulate metal 21 moves from the surface of the carbon nanotube 30, the particulate metal 21 is fixed to the substrate 10 when it reaches the surface of the substrate 10. Thus, the carbon nanotube 30 is oxidized and cut at the area in the vicinity of the side where it comes in contact with the particulate metal 21 similarly to the 1st embodiment.

Referring to the rise in the particle diameter of the particulate metal 21, if glass having little trap is used as substrate 10, the particle diameter of the particulate metal may be not smaller than 100 nm to allow the particulate metal to be fixed to the surface of the substrate 10.

3rd Embodiment

A novel carbon nanotube structure obtained by reducing the thickness of a continuous carbon nanotube at a longitudinally middle point unlike the 1st and 2nd embodiments and a process for the production thereof will be described hereinafter.

The carbon nanotube structure obtained by the production process is a hollow graphene sheet structure having a graphene sheet having at least one layer and tube shape and a region in a longitudinal direction in which another graphene sheet having at least one layer is laminated on the graphen sheet.

Figure 8:
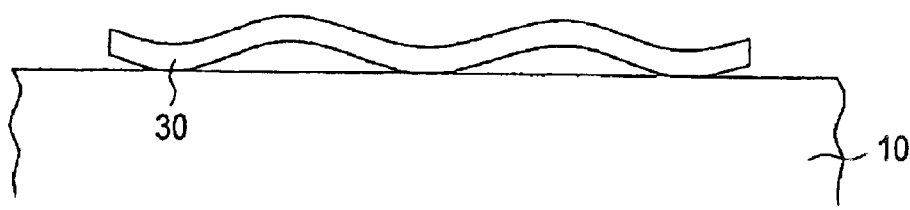
FIG. 8 is a schematic enlarged sectional view illustrating a carbon nanotube (hollow graphene sheet material) disposed on the surface of a substrate.
Figure 9:
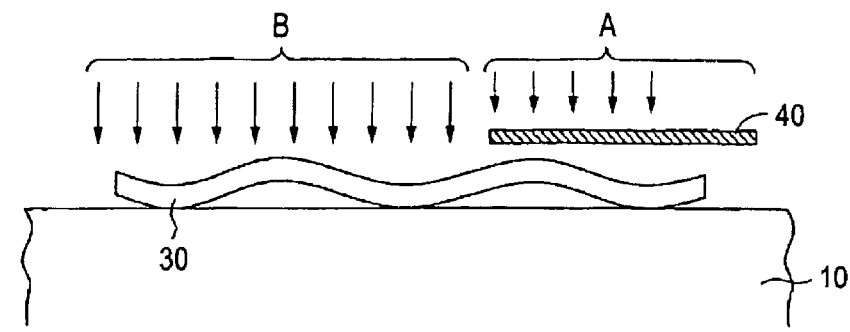
FIG. 9 is a schematic enlarged sectional view illustrating a step of vacuum evaporating with a mask.
Figure 10:
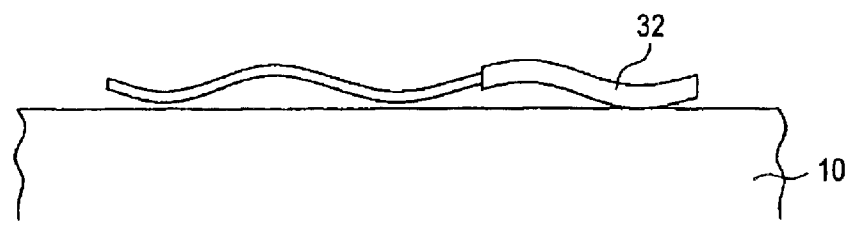
FIG. 10 is a schematic enlarged sectional view illustrating a carbon nanotube having a region where it is reduced in diameter (hollow graphene sheet structure)
Figure 11:
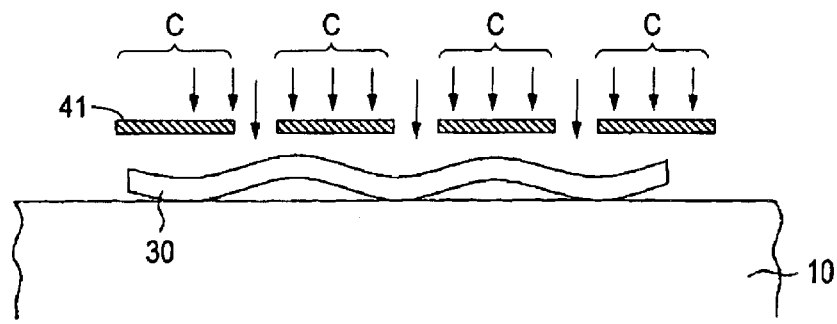
FIG. 11 is a schematic enlarged sectional view illustrating a step of making patterned vacuum deposition.

FIGS. 8 to 11 each are an enlarged sectional view schematically illustrating the process for the production of a carbon nanotube structure according to the present embodiment. FIG. 8 illustrates how the carbon nanotube 30 is disposed on the surface of the substrate 10, FIG. 9 illustrates how a metal is vacuum-evaporated onto the carbon nanotube 30 with a mask 40, FIG. 10 illustrates a carbon nanotube structure which is reduced in thickness at the area of carbon nanotube 30 other than the masked portion, and FIG. 11 illustrates how a metal is vacuum-evaporated onto the carbon nanotube 30 with a patterned mask 41.

Firstly, a dispersion of carbon nanotube 30 in an organic solvent is sprayed onto the surface of the substrate 10 similarly to the 2nd embodiment so that the carbon nanotube 30 is disposed on the surface of the substrate 10 as shown in FIG. 8.

In this case, in order to reduce the diameter of the carbon nanotube 30 in a longitudinal portion, the carbon nanotube 30 needs to be a multi-wall carbon nanotube. This is because a single wall carbon nanotube, if used, decomposes at the site where particulate platinum is attached thereto similarly to the 1st or 2nd embodiment, providing nothing but severed carbon nanotubes.

Taking into account the foregoing description, the length of the carbon nanotube 30 to be used in the present embodiment is preferably from 10 nm to 100 $\mu$m, more preferably from 20 nm to 10 $\mu$m. When the length of the carbon nanotube 30 falls below 20 nm, it is made difficult to reduce the diameter of the carbon nanotube 30 along the longitudinal direction. On the contrary, when the length of the carbon nanotube 30 exceeds 10 $\mu$m, the carbon nanotubes can become entangled with each other, making it difficult to work the carbon nanotube 30.

The diameter of the carbon nanotube 30 needs to be selected depending on the purpose of working. However, when the diameter of the carbon nanotube 30 falls below 10 nm, the carbon nanotube 30 can be cut by oxidation as mentioned above.

The number of the graphene sheet layers constituting the carbon nanotube 30 is several to scores. However, the number of the layers of carbon nanotube 30 to be used in the present embodiment is not limited to this range.

Subsequently, sputtering is made on the carbon nanotube 30 with a predetermined region A covered by the mask 40 as shown in FIG. 9 to form a thin metal film on the carbon nanotube 30 on the region B other than the predetermined region A. In FIG. 9, the arrow indicates the movement of metal atoms and molecules sputtered by argon ion or the like. The metal and molecules don't reach the region A of the carbon nanotube 30 masked by the mask 40.

Thereafter, in the present embodiment, the carbon nanotube 30 is oxidized at a heating step in an oxygen-containing atmosphere without passing through the metal globurization step (pretreatment step).

As the metal to be used in the thin metal film there is used a catalyst which preferentially induces the oxidation of the carbon nanotube 30 toward the center thereof (vertical direction). As the foregoing catalyst there is preferably used particulate platinum. In other words, even when vacuum-evaporated to a thin film, particulate platinum move and agglomerate little at around the temperature where oxidation by catalytic action occurs. Thus, it is thought that particulate platinum oxides and corrodes vertically the carbon nanotube present in the vicinity of the particulate platinum at the heating step. Accordingly, by vacuum-evaporating the carbon nanotube 30 masked as mentioned above, a carbon nanotube 32 (carbon nanotube structure) having a reduced diameter at the region B where particulate platinum is present can be obtained as shown in FIG. 10.

In order to produce the carbon nanotube structure according to the present embodiment, a thin platinum film may be formed on a predetermined region using a mask as mentioned above. Alternatively, particulate platinum may be attached to only the surface of a plurality of carbon nanotube layers laminated on the surface of a substrate so that it is oxidized to reduce the diameter of the carbon nanotube only at the portion in the vicinity of the surface thereof, thereby providing the carbon nanotube structure.

The specificity of particulate platinum to other particulate metals is unknown. However, it is thought that platinum has a considerably higher melting point than other metals and thus can difficultly melt and agglomerate at the oxidation temperature of the carbon nanotube 30, causing oxidation reaction in preference to agglomeration of platinum.

As mentioned above, in the present embodiment, it is necessary that platinum be sputtered for globurization. Thus, the thickness of the thin metal film thus sputtered is preferably from 1 to 10 nm, and the particle diameter of particulate platinum thus formed is preferably from 0.1 to 5 nm.

In the heating step at which the diameter of the carbon nanotube 30 is reduced as in the present embodiment, the heating temperature is preferably from $T_0$ to $T_0+200°$ C. supposing that $T_0$ is the combustion starting temperature of the carbon nanotube 30 in the presence of the catalyst.

In the present embodiment, as shown in FIG. 11, particulate platinum can be attached to the carbon nanotube 30 through a desirably patterned mask 41 to obtain a carbon nanotube structure having a varied diameter or which is cut according to the distance C between the lines of pattern. In FIG. 11, the arrow indicates the movement of metal atoms and molecules sputtered as in FIG. 9.

4th Embodiment

In the present embodiment, an example of an electrode structure having a minute gap, an electrode structure comprising a pair of electrodes opposed to each other with a gap and a process for the production thereof will be described.

Figure 12:
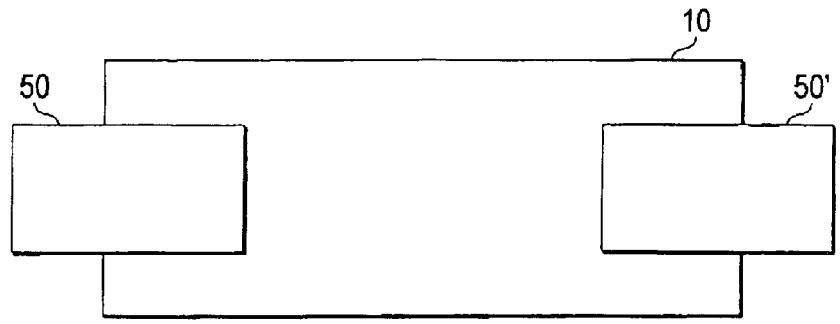
FIG. 12 is an enlarged view illustrating the disposition of electrode.
Figure 13:
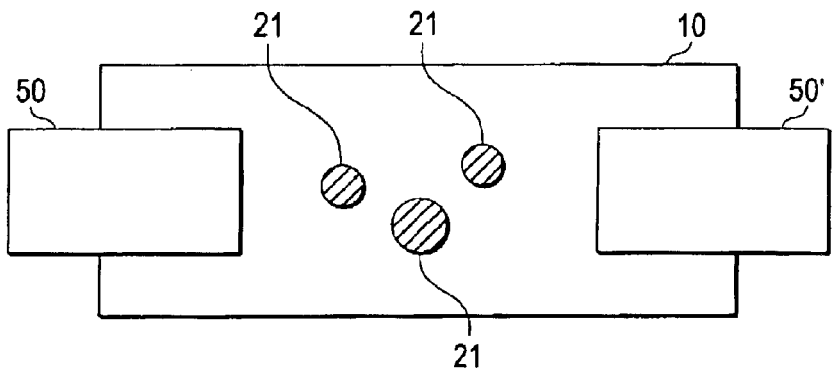
FIG. 13 is an enlarged view illustrating a particulate metal formed between electrodes.
Figure 14:
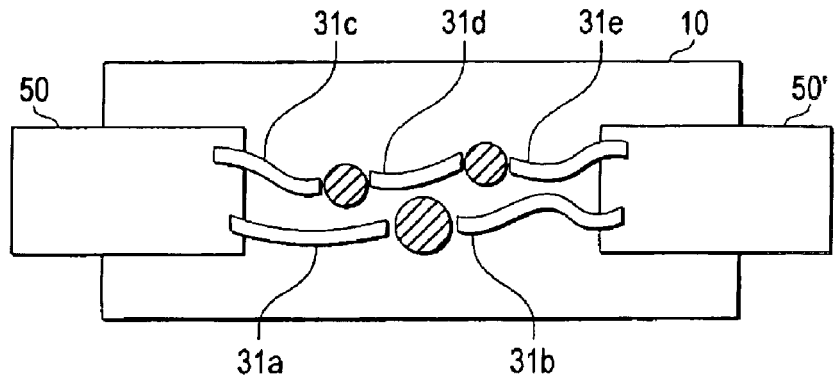
FIG. 14 is an enlarged view illustrating an electrode structure of the invention.

FIGS. 12 to 14 each are an enlarged view schematically illustrating the process for the production of an electrode structure according to the present embodiment. FIG. 12 illustrates the disposition of electrodes 50, 50', FIG. 13 illustrates how metal particles 21 are formed between the electrodes 50, 50', and FIG. 14 illustrates an electrode structure having a minute gap.

Firstly, as shown in FIG. 12, electrodes 50, 50' are formed on the surface of a substrate 10 as terminals connected to the exterior. The distance between the electrodes 50, 50' is preferably from 10 nm to 20 $\mu$m, taking into account the length of the carbon nanotube to be used in the formation of electrode structure. Subsequently, sputtering of a metal having an oxidizing catalytic action on the carbon nanotube is made on the surface of the substrate 10, the metal having a small thickness. The substrate 10 is then heated to around the melting point of the metal to form metal particles 21 as shown in FIG. 13. When cooled, these metal particles 21 are fixed to the surface of the substrate 10.

The particle diameter of the metal particles 21 and the distance between the metal particles 21 need to be predetermined such that when the carbon nanotubes described later are disposed between the electrodes 50, they come in contact with at least one metal particle 21 at least at one point. From this standpoint of view, the particle diameter of the metal particles 21 is preferably from 10 nm to 1 $\mu$m. The distance between the particles is preferably from 10 nm to 5 $\mu$m.

Subsequently, the carbon nanotubes are disposed between the electrodes 50, 50'. In order to dispose the carbon nanotubes between the electrodes 50, 50', the carbon nanotube powder may be attached to the surface of the substrate 10 so that the carbon nanotubes are disposed at random. Eventually, the carbon nanotubes electrically connected to the electrodes 50, 50' maybe utilized. Alternatively, as already mentioned, while being observed under SPM using the carbon nanotube as a probe, the carbon nanotube can be disposed between the electrodes 50, 50'. However, taking into account the productivity, the former process is effective.

The preferred length and diameter of the carbon nanotube to be used in the present embodiment are the same as used in the 1st embodiment.

Subsequently, the substrate 10 is heated to a temperature inducing oxidation of carbon nanotube by the particulate metal 21 in an oxygen-containing atmosphere. The carbon nanotube undergoes decomposition by oxidation to disappear at the portion in contact with the particulate metal 21. At the same time, there is formed a gap between the end of the carbon nanotubes 31$a$ and 31$b$ thus separated on the particulate metal 21 side thereof and the particulate metal 21 which is an extremely small as compared with the size of the particulate metal 21.

In the case where one carbon nanotube is cut at two or more points, not limited to one, to give pieces 31$c$, 31$d$ and 31$e$, there may be formed such a minute gap at a plurality of points as shown in FIG. 14.

Thus, an electrode structure having a particulate metal disposed between the adjacent ends of a pair of carbon nanotubes and a minute gap between the particulate metal and each of the adjacent ends of the pair of carbon nanotubes can be obtained.

The gap between the adjacent ends of the pair of carbon nanotubes in the electrode structure can be controlled by selecting the size of the particulate catalyst.

The minute gap between the particulate metal 21 disposed between the adjacent ends of the pair of carbon nanotubes and the end 31 of one of the adjacent carbon nanotubes 31 is from 0.1 to 50 nm as in the foregoing description.

Subsequently, the electrode structure shown in FIG. 14 having carbon nanotubes thus severed fixed to the surface of the substrate 10 is entirely dipped in a solution for dissolving the particulate metal 21 (aqua regia in the case of particulate gold) to remove the particulate metal 21, making it possible to obtain an electrode structure free of particulate metal between the adjacent ends of the pair of carbon nanotubes.

Thus, the foregoing process can apply not only to carbon nanotube but also to other hollow graphene sheet materials. Therefore, the invention can provide an electrode structure having a pair of electrodes disposed opposed to each other with a gap, in which the electrodes are a pair of hollow graphene sheets, the pair of hollow graphene sheets are disposed in a continuous form, and adjacent ends of the pair of hollow graphene sheets are opposed to each other with the gap. At the same time, an electrode structure having a particulate metal disposed in the gap and a minute gap between the particulate metal and each of the adjacent ends of the pair of hollow graphene sheet materials can be obtained.

5th Embodiment

In the present embodiment, an example of an electrode structure having a particulate metal disposed between the adjacent ends of a pair of carbon nanotubes in which the particulate metal is electrically connected to one of the ends of the pair of carbon nanotubes and a process for the production thereof will be described.

The term "electrically connected" as used herein is meant to indicate mainly that two materials are in physical contact or connection with each other to make conduction. For example, electrical connection developed by flying of electrons in the space is included.

The foregoing electrode structure can be produced by any of the following two processes.

One of the two processes involves the use of an electrode structure having a particulate metal disposed between the adjacent ends of a pair of carbon nanotubes wherein there is a minute gap between the particulate metal and each of the adjacent ends of the pair of carbon nanotubes as produced in the 4th embodiment whereby the particulate metal and one of the adjacent ends of the pair of carbon nanotubes are connected to each other by a connecting means. Examples of this connecting means include connection of the particulate metal to one of the adjacent ends of the pair of carbon nanotubes using an electrically-conductive nanotube. The connection may be accomplished by merely allowing the nanotube to come in contact with the particulate metal and one of the adjacent ends of the carbon nanotubes or by chemically bonding them. However, the foregoing connecting means is not limited to above.

Another process involves the specific utilization of formation of particulate metal and cutting of carbon nanotube in the 4th embodiment. In other words, no minute gap is formed between the particulate metal and each of the adjacent ends of the pair of carbon nanotubes after cutting the carbon nanotube of the 4th embodiment. One of the adjacent ends of the pair of carbon nanotubes remains in contact with the particulate metal after cutting.

Figure 15:
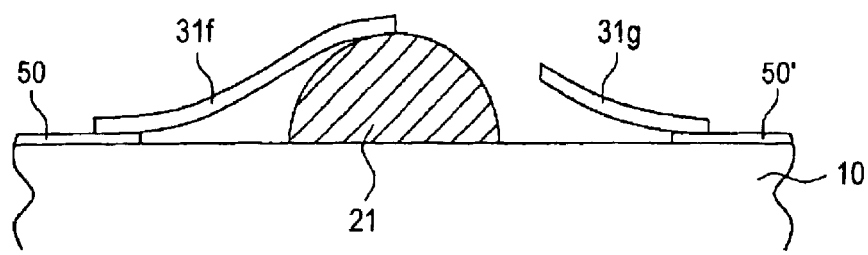
FIG. 15 is a schematic enlarged sectional view illustrating other electrode structure of the invention.

FIG. 15 is an enlarged view schematically illustrating the foregoing state. In FIG. 15, 31f and 31g indicate carbon nanotubes which have been oxidized and severed by the particulate metal 21. While the carbon nanotube 31g is definitely separated from the particulate metal 21 to form a minute gap, the carbon nanotube 31f remains in contact with and electrically connected to the particulate metal 21 after cutting. Accordingly, this state is eventually similar to that formed by connecting the particulate metal 21 to one of the ends of the carbon nanotubes close thereto by the connecting unit.

In order to form this state, the particulate metal 21 preferably has a particle diameter greater than a certain value. In other words, when the particulate metal 21 is great, it comes in contact with the uncut carbon nanotubes at an increased number of points and an increased area. Therefore, after cutting, it is more likely that the state shown in FIG. 15 can occur. It is also thought that the greater the particle diameter of the particulate metal 21 is, the less is the reduction of catalyst activity.

6th Embodiment

In the present embodiment, a device utilizing an electrode structure having a minute gap between a particulate metal and each of the adjacent ends of a pair of carbon nanotubes obtained in the 4th embodiment will be described.

The electrode structure comprising a pair of carbon nanotubes having a minute gap therebetween according to the 4th embodiment is very useful for the preparation of nanoscale electronic device. In other words, in order to prepare a nanoscale high integration device, it is necessary that the width and length of wiring be reduced and the size of fundamental functional elements such as resistor and capacitor and other high performance functional elements having memory properties be reduced. This of course requires that the distance between the electrical terminals of the functional elements thus reduced in size be reduced. Accordingly, in order to connect terminals for supplying electric power to the functional elements, an electrode structure having a minute gap is needed. The small the minute gap is, the smaller is the size of the functional element which can be connected.

Figure 16:
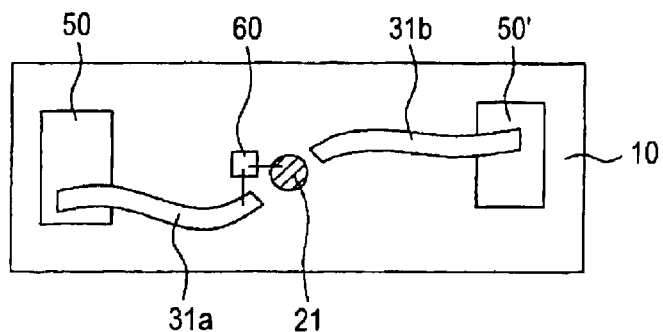
FIG. 16 is an enlarged view illustrating the structure of a device of the invention.

FIG. 16 is an enlarged view illustrating the structure of a device according to the present embodiment. In FIG. 16, a functional element 60 is connected to the end of a carbon nanotube 31a which is one of carbon nanotubes separated and a particulate metal 21 disposed opposed to the end of the carbon nanotube 31a with a minute gap. By connecting an electrode 50 and a particulate metal 21 to the exterior, a device having the foregoing structure is provided.

The device according to the present embodiment embodied by connecting the foregoing electrode structure having a pair of carbon nanotubes having a minute gap as an electrode to the foregoing functional element has many advantages over conventional silicon devices that since the carbon nanotube as electrode in the device is soft, the functional element can be connected with some degree of freedom with respect to the size of the functional element, the device is a carbon nanotube electrode having a diameter smaller than the resolution of lithography, and chemical bonding can be used for connection. With these advantages, direct access can be made to a functional element having a molecular size as small as not greater than 5 nm. Accordingly, the use of the electrode structure of the invention makes it easy to produce a high density large scale electronic integrated circuit at a reduced cost.

By designing a nanonetwork comprising a nanowire obtained by modifying the graphene sheet on the surface of carbon nanotube as a functional element for molecular electronics and connecting this functional element to the ends of the carbon nanotubes disposed opposed to each other with a minute gap and the particulate metal, a molecular switch, a molecular memory, molecular processor, etc. can be realized.

7th Embodiment

In the present embodiment, other device utilizing an electrode structure having a minute gap between a particulate metal and each of the adjacent ends of a pair of carbon nanotubes obtained in the 4th embodiment will be described. This device is a device obtained by inserting a functional organic molecule in the minute gap between the ends of the carbon nanotubes disposed opposed to each other with a minute gap and the particulate metal.

Figure 17:
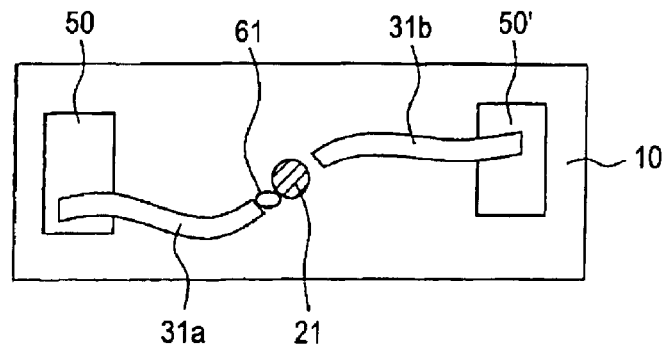
FIG. 17 is an enlarged view illustrating the structure of other device of the invention.

FIG. 17 is an enlarged view of the structure of the device according to the present embodiment. In FIG. 17, a functional organic molecule 61 is disposed interposed between the end of a carbon nanotube 31a, which is one of carbon nanotubes separated, and a particulate metal 21 disposed opposed to the end of the carbon nanotube 31a with a minute gap. By connecting an electrode 50 and a particulate metal 21 to the exterior, a device having the foregoing structure is provided.

Examples of the foregoing functional organic molecule include ion, crystal, particle, polymer, and molecule and tissue extracted from living body. The properties of these functional organic molecules are insulating properties, electrical conductivity, semiconductivity (concept including both semiconductivity and electrical resistance), light absorption, light emitting properties, color development properties, contraction and expansion properties, electricity generating properties, and photoelectric properties. Materials which change in these properties change with temperature, humidity and atmospheric gas may be used.

The functional organic molecule may be one having a designed function such as functional polymer and functional particulate material. In recent years, many polymers and particulate materials have been found to have semiconductor properties. The use of these materials makes it possible to provide a device having a switching function or memory function.

In particular, a molecule having charge unevenly distributed therein is desirable as the functional organic molecule. Examples of such a molecule include a molecule having a charge-donating property of molecule and a charge-accepting property of molecule in combination, a molecule having a symmetric molecule combined with a charge-donating or charge-accepting property of molecule, a macromolecule comprising repetition thereof, and a molecular aggregate having a function developed by the aggregation of these molecules. The charge-donating properties and charge-accepting properties can be defined by the value of electron affinity or ionization potential.

Further, biomolecules such as DNA and collagen or artificial molecules imitating living body maybe used, making it possible to add functions analogous to that of living body.

Referring to the process for inserting such a functional organic molecule in the minute gap, a functional polymer, if used, may be disposed in the minute gap in the form of molecule scale or aggregate. Alternatively, the reactive terminals of such a functional polymer may be chemically bonded to the ends of the carbon nanotube and/or the particulate metal. Further, the functional organic molecule thus inserted may be electrically connected to the particulate metal and/or the adjacent ends of the carbon nanotubes.

Thus, in accordance with the 6th and 7th embodiments, a device utilizing an electrode structure having a minute gap between a particulate metal and each of the adjacent ends of a pair of carbon nanotubes of the invention can be prepared.

The electrode structure free of particulate metal in the gap and comprising carbon nanotubes disposed in a continuous form wherein their ends are opposed to each other as described in the 4th embodiment may be used as an electrode structure for the foregoing device, though having an increased gap.

The foregoing process can apply not only to carbon nanotube but also to other hollow graphene sheet materials similarly to the 6th and 7th embodiments. By connecting a functional element with a minute gap formed between the end of the hollow graphene sheet material and the particulate metal or inserting a functional organic molecule in the minute gap, a device provided with various functions of functional element and functional organic molecule can be formed.

The invention has been described with reference to seven embodiments. The 1st to 7th embodiments have been described with reference to the case where a carbon nanotube is used. In the case where other hollow graphene sheet materials such as carbon nanohorn, carbon nanobeads and carbon nanocoil are used, the foregoing embodiments can apply with respect to length, diameter, etc. The production of these hollow graphene sheet materials can be accomplished by the same process as mentioned above.

The invention will be further described in the following examples.

EXAMPLE 1

(Step 1)
The surface of a glass substrate was sputtered with gold from a gold plate in an argon atmosphere to form a uniform film thereon to a thickness of 3 nm.

(Step 2)
The glass substrate on which a thin gold film had been formed (at the step 1) was heated to a temperature of 550° C. in a muffle furnace for 2 hours to form metal particles having an average diameter of 200 nm and an average interparticle space of 500 nm thereon (pretreatment step).

(Step 3)
0.02 g of a multi-wall carbon nanotube (purity: 90–95%; average length: 3 μm; average diameter: 30 nm) was added to 20 g of tetrahydrofuran. The mixture was then subjected to thorough dispersion at an output of 3W by means of a ultrasonic dispersing machine to prepare a carbon nanotube dispersion.

(Step 4)
A few droplets of the dispersion prepared (at the step 3) were dropped onto one side of the glass substrate having gold particles thereon obtained (at the step 2) through a dropping pipette. Tetrahydrofuran was then evaporated to allow the carbon nanotubes to be uniformly disposed on the surface of the substrate.

Figure 18:
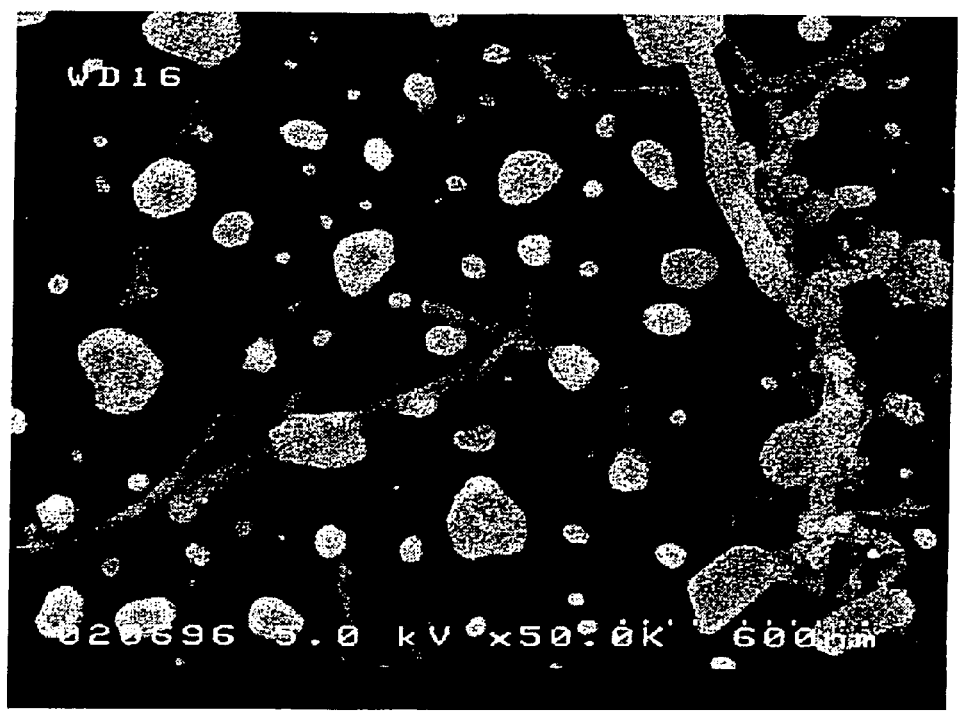
FIG. 18 shows a carbon nanotube structure (hollow graphene sheet structure) of an example.

(Step 5)
The substrate prepared (at the step 4) was heated to a temperature of 400° C. in a muffle furnace for 2 hours to cut the nanotube at the site where the particulate gold and the carbon nanotube come in contact with each other (heating step). FIG. 18 shows the carbon nanotube structure thus obtained (magnification power: ×50,000). The magnification power of the drawing has some error due to enlargement (This applies also to FIG. 19).

In FIG. 18, the white particles are gold particles and string-shaped materials are carbon nanotubes. As can be seen in FIG. 18, the carbon nanotube is cut at the site where a particulate gold exists in the middle point in a continuous form of carbon nanotubes. Eventually, it is made obvious that a carbon nanotube structure having the adjacent ends of a pair of carbon nanotubes opposed to each other with a gap had been formed.

EXAMPLE 2

(Step 1)

0.02 g of a multi-wall carbon nanotube (purity: 90–95%; average length: 3 μm; average diameter: 30 nm) was added to 20 g of tetrahydrofuran. The mixture was then subjected to thorough dispersion by a ultrasonic wave having an output of 3W to obtain a carbon nanotube dispersion.

(Step 2)

A few droplets of the dispersion prepared (at the step 1) were dropped onto the surface of a glass substrate. The solvent was then evaporated to allow the carbon nanotubes to be uniformly disposed on the surface of the substrate.

(Step 3)

The surface of the substrate on which carbon nanotubes had been disposed (at the step 2) was sputtered with platinum from a platinum plate in an argon atmosphere to form a uniform thin platinum film thereon to a thickness of 3 nm.

(Step 4)

Figure 19:
FIG. 19 shows a carbon nanotube structure (hollow graphene sheet structure) of other example.

The substrate on which a thin platinum film had been formed (at the step 3) was heated to a temperature of 400° C. in a muffle furnace for 2 hours (heating step). FIG. 19 shows the carbon nanotube structure thus obtained (magnification power: ×30,000).

In FIG. 19, the fine branch-like materials are carbon nanotubes the diameter of which have been reduced by oxidation and string-shaped materials are unoxidized carbon nanotubes. As can be seen in FIG. 17, the carbon nanotube is reduced in diameter at the area in the vicinity of the surface on which platinum particles have been vacuum-deposited, but the carbon nanotube is not reduced in diameter in the interior of carbon nanotube layer on which platinum particles have not been vacuum-deposited (in the vicinity of glass substrate).

As can be seen in the foregoing description, when a multi-wall carbon nanotube is oxidized with platinum disposed as a particulate catalyst, the carbon nanotube can be reduced in diameter only at the region where the platinum particles are disposed. Accordingly, by vacuum-evaporating platinum with a desired mask, a carbon nanotube structure having longitudinal regions with different numbers of laminated graphene sheets (partly different diameters) can be obtained.

In accordance with the invention, the hollow graphene sheet material comprising carbon nanotube can be shaped without impairing the properties thereof. The hollow graphene sheet structure thus obtained can be used for various purposes.

Further, the use of the electrode structure of the invention obtained similarly makes it possible to prepare a finer high integration device.

What is claimed is:

1. A process for the production of a hollow graphene sheet structure comprising the steps of:
   providing a substrate on which a particulate metal inducing oxidation of a graphene sheet is fixed;
   contacting a hollow graphene sheet with said particulate metal fixed on said substrate; and
   heating the particulate metal in an atmosphere containing oxygen to work shape the hollow graphene sheet,
   wherein the heating step comprises heating the particulate metal at temperature lower than temperature at which the hollow graphene sheet is combusted in the absence of the particulate metal.

2. The process according to claim 1, comprising the steps of:
   disposing the particulate metal at a middle position of the hollow graphene sheet in a longitudinal direction; and
   oxidizing the hollow graphene sheet in the vicinity of the position where the particulate metal is disposed to cut the hollow graphene sheet.

3. The process according to claim 1, further comprising removing the particulate metal.

4. The process according to claim 1, wherein the particulate metal is a particulate gold.

5. A process for the production of a hollow graphene sheet structure comprising the steps of:
   contacting a particulate metal inducing oxidation of a graphene sheet with a hollow graphene sheet; and
   heating the particulate metal in an atmosphere containing oxygen to work shape the hollow graphene sheet,
   wherein the particulate metal is at least one member selected from the group consisting of particulate silver, particulate copper, and particulate platinum, and
   wherein the heating step comprises heating the particulate metal at temperature lower than temperature at which the hollow graphene sheet is combusted in the absence of the particulate metal.

6. The process according to claim 5,
   wherein the hollow graphene sheet is a multi-wall carbon nanotube; and
   wherein the particulate metal is a particulate platinum.

7. A process for the production of a hollow graphene sheet structure comprising the steps of:
   disposing a particulate metal inducing oxidation of a graphene sheet at a middle position of a hollow graphene sheet in a longitudinal direction using a mask to prevent disposing the particulate metal at portions of the hollow graphene sheet other than said middle portion, and
   heating the particulate metal in an atmosphere containing oxygen to work shape the hollow graphene sheet,
   wherein the heating step comprises heating the particulate metal at temperature lower than temperature at which the hollow graphene sheet is combusted in the absence of the particulate metal.

8. A process for production of an electrode structure, comprising the steps of:
   disposing particulate metal only at a middle position of a hollow graphene sheet in a longitudinal direction; and
   oxidizing the hollow graphene sheet in the vicinity of the position where the particulate metal in an atmosphere containing oxygen cuts the hollow graphene sheet at the point, whereby the electrode structure is formed.

9. The process according to claim 8, wherein, during said disposing step, the particulate metal is fixed to a surface of a substrate.

10. The process according to claim 8, further comprising removing the particulate metal.

11. The process according to claim 8, wherein the particulate metal is a particulate gold.

12. The process according to claim 8, wherein the particulate metal is at least one of particulate silver, particulate copper, and particulate platinum.

13. The process according to claim 5, wherein, during said applying step, the particulate metal is fixed to a substrate.

14. The process according to claim 5, comprising:
   disposing the particulate metal at a middle position of the hollow graphene sheet in a longitudinal direction; and
   oxidizing the hollow graphene sheet in the vicinity of the position where the particulate metal is disposed to cut the hollow graphene sheet.

15. The process according to claim 14, wherein said particulate metal is disposed at said middle portion using a mask.

16. The process according to claim 5, further comprising removing the particulate metal.

17. The process according to claim 7, wherein the particulate metal is particulate gold.

18. The process according to claim 7, further comprising removing the particulate metal.

19. A process for the production of a hollow graphene sheet structure comprising the steps of:

providing a substrate on which a particulate metal inducing oxidation of a graphene sheet is fixed;

contacting a hollow graphene sheet with said particulate metal fixed on said substrate; and heating the particulate metal in an atmosphere containing oxygen, wherein the heating step comprises heating the particulate metal at temperature lower than temperature at which the hollow graphene sheet is combusted in the absence of the particulate metal.

20. The process according to claim 19, further comprising removing the particulate metal.

* * * * *